United States Patent [19]

Morris

[11] 3,742,198

[45] June 26, 1973

[54] APPARATUS FOR UTILIZING A THREE-FIELD WORD TO REPRESENT A FLOATING POINT NUMBER

[75] Inventor: Robert Morris, Millington, N.J.

[73] Assignee: Bell Telephone Laboratories, Incorporated, Murray Hill, N.J.

[22] Filed: Mar. 19, 1971

[21] Appl. No.: 126,016

[52] U.S. Cl. ................ 235/154, 235/156, 340/172.5

[51] Int. Cl. ................ G06f 3/00

[58] Field of Search ................ 235/15, 56–168; 340/172.5

[56] References Cited

UNITED STATES PATENTS

| | | | |
|---|---|---|---|
| 3,056,550 | 10/1962 | Horrell | 235/156 X |
| 3,434,114 | 3/1969 | Arulpragasam | 340/172.5 |
| 3,496,550 | 2/1960 | Schachner | 340/172.5 |
| 3,539,790 | 11/1970 | Shimabukuro | 235/159 |
| 3,569,685 | 5/1971 | Chesley | 235/156 |

*Primary Examiner*—Charles D. Miller
*Attorney*—W. L. Keefauver

[57] ABSTRACT

Apparatus and method embodying a novel representation of a floating point number. The novel representation utilizes a computer word having two fields of fixed length one of which is subdivided into two fields of variable length, thereby effectively resulting in three fields. This novel representation allows a large trade-off to be made between accuracy and exponent range within the bounds of a single fixed-length data word.

3 Claims, 3 Drawing Figures

INVENTOR
R. MORRIS
BY R.O. Nimtz
ATTORNEY

APPARATUS FOR UTILIZING A THREE-FIELD WORD TO REPRESENT A FLOATING POINT NUMBER

BACKGROUND OF THE INVENTION

1. Field of the Invention

This invention relates to digital computers employing floating point arithmetic operations and, more particularly, to the use in such computers of a new representation of floating point numbers.

2. Description of the Prior Art

Floating point arithmetic operations are well known in the art and are today available on virtually all computers designed for scientific computing applications. These machines typically use a single digital word to store each individual floating point number. Each such word comprises two parts, the scale factor, or exponent, and the fraction. The exponent specifies a power of some radix by which the fraction is to be multiplied to obtain the number represented. That is, the pair (E,F) represents the floating point number $$F \cdot B^E \quad (1)$$

where $E$ is the exponent, $F$ is the fraction, and $B$ represents the base or radix of the number system being used.

The accuracy of a floating point number depends upon the number of digits in the fraction. Thus all fixed-length representations of floating point numbers include an inherent error. This error, $\Delta x$, which is solely due to the representation of a number $x$ in floating point form, is determined by $$\Delta x = x\,(\tfrac{1}{2}B^{-f+1}) \quad (2)$$

where $f$ is the number of digits in the fraction $F$.

The discussion above applies to any representation that might be used, such as, for example, binary, decimal, or hexadecimal. Since most digital computing machines utilize the binary representation, B will often be equal to two. The further discussion below will be directed particularly to the binary case, although it applies equally well to nonbinary cases with the appropriate changes in the formulae that will be apparent to those of ordinary skill in the art.

The magnitude of the number that can be represented in floating point form in a fixed-length word is determined by the number of digits in the exponent. If the exponent contains $e$ digits then the maximum exponent range possible is $2^e$. If numbers of both large and small magnitude are to be represented, then one of the exponent bits can be and usually is treated as the sign of the exponent. In this case the largest magnitude that can be represented is $2^{(2^{r}-1)}$ and the smallest magnitude that can be represented is $\tfrac{1}{2}\cdot 2^{(-2^{r}+1)}$. This assumes, of course, that the binary point is to the left of the leftmost digit of the fraction and that the fraction is normalized.

It can thus be seen that given a fixed-length computer word, one has the choice of either having the capability of representing very large magnitudes by increasing the number of digits in the exponent or of having the capability of representing numbers very accurately by increasing the number of digits in the fraction. In the prior art this decision has been made during the initial design of a particular computer and the number of digits of an exponent and a fraction has been fixed, causing the range and accuracy of numbers that can be represented to be fixed. This can best be seen by way of an illustrative example.

Suppose that a fixed-length computer word of 36 bits is used to represent floating point numbers. If one bit is used for the sign of the fraction, and 1 bit is used for the sign of the exponent, then 34 bits are available to represent the magnitude of the exponent and the fraction. A popular choice, embodied, for example, in the IBM 7090 and GE 635, is to use 7 bits for the exponent and 27 bits for the fraction. The largest representable number is then $2^{(2^7-1)} = 2^{127}$ or approximately $10^{38.1}$. The smallest representative number is $\tfrac{1}{2}\cdot 2^{(-2^7+1)} = 2^{-128}$ or approximately $10^{-38.4}$.

The maximum relative error due to this representation, that is, the magnitude of the error divided by the magnitude of the number being represented, can be found by dividing both sides of Equation (2) by $x$ and by letting $B = 2$ and $f = 27$:

$$\Delta x/x = \tfrac{1}{2}\cdot 2^{-27} = 2^{-28} = 10^{-8.4}. \quad (3)$$

This means that numbers $x$ in the range $10^{-38} < |x| < 10^{38}$ can be represented with about eight decimal places of accuracy by a fixed-length word of 36 bits in which 7 bits are used for the exponent and 27 bits are used for the fraction. Since it is true that one decimal place of accuracy corresponds to approximately 3 bits of fraction, the following results can be obtained by trading fraction bits for exponent bits and vice versa. The cost of gaining a single decimal place of accuracy is the use of 3 of the 7 exponent bits as fraction bits, leaving only 4 exponent bits. Thus the range is restricted to $10^{-5} < |x| < 10^{5}$. Going the other way, by using 3 fraction bits as exponent bits, a single decimal place of accuracy can be traded for an extension of the range to $10^{-300} < |x| < 10^{300}$.

It is obvious that the desirability of performing either of these two trade-offs depends entirely upon the particular computation that one is performing. Indeed, it is quite possible that it might be extremely desirable to perform several such trade-offs during the course of computations pertaining to a single problem.

Therefore it is an object of this invention to provide a novel representation of numbers in a digital computer.

It is another object of this invention to provide a means for allowing a fixed-length digital computer word to be used in such a manner as to permit, on a single word basis, a trade-off between accuracy and range of floating point numbers.

It is a further object of this invention to provide a simple method of using this novel representation.

It is a still further object of this invention to provide a means by which the use of this new representation of numbers can be incorporated into existing digital computers.

SUMMARY OF THE INVENTION

These objects are achieved in accordance with this invention through the use of a new floating point representation of numbers. This new representation, termed "tapered floating point," effectively divides a fixed-length digital computer word into three fields: a first fixed-length field that is subdivided into a variable length exponent field and a variable length fraction field, and a second fixed-length field that serves to specify the size of the variable length exponent field. Apparatus is provided for transforming tapered floating point numbers into conventional floating point numbers, thereby allowing existing floating point arithmetic units to be utilized to perform computations on such numbers. Apparatus is also provided for transforming conventional floating point numbers into tapered floating point numbers, thereby allowing the results of the conventional floating point computations to be stored as tapered floating point numbers.

DETAILED DESCRIPTION

Figure 1:
FIG. 1 shows the prior art format of fixed-length computer words used to store floating point numbers.

FIG. 1 shows a typical prior art floating point number format. It is common practice in the prior art to store entire floating point numbers in a single fixed-length word, thus necessitating a field, such as field 1 shown in FIG. 1, for the exponent, and a field, such as field 2, for the fraction. The solid line 3 shown separating fields 1 and 2 is meant to indicate that the length of each of these two fields is fixed.

Figure 2:
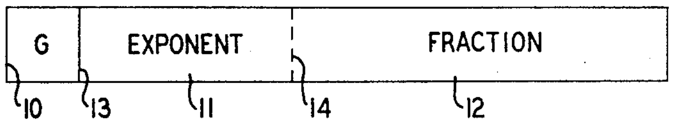
FIG. 2 shows the format of the fixed-length tapered floating point computer words of the present invention.

FIG. 2 shows the format of a fixed-length tapered floating point word. Tapered floating point representation is seen to comprise two fields of fixed length: the *G* field 10, and the combination of the exponent field 11 and the fraction field 12. Solid line 13 indicates that the length of field *G* is fixed. Dashed line 14 indicates that the length of the exponent field 11 and hence the length of the fraction field 12 is variable. The magnitude of the number stored in *G* field 10 indicates the number of bits in the exponent field of the word. The tapered floating point representation can perhaps best be appreciated by a particular example.

Suppose that the word shown in FIG. 2 is 36 bits long with 1 bit being used for the sign of the exponent and 1 bit being used for the sign of the fraction. Assume further that the number of bits, $g$, in the *G* field is equal to 3. This means that the value of the number stored in the *G* field, which will be designated $\hat{G}$, can be from zero to seven. Assume further that the *G* field is interpreted to mean that the number $e$ of bits in exponent field 11 shown in FIG. 2 is equal to one more than the value of the number in the *G* field, that is, $$e = \hat{G} + 1 \tag{4}$$

then the number of fraction bits $f$ will be equal to $$f = 31 - e = 30 - \hat{G} . \tag{5}$$

Once their lengths are established, the exponent and fraction fields are interpreted and used in the same manner as in the conventional floating point representation.

It follows from this representation that when $\hat{G} = 0$, exponent field 11 will contain only 1 bit while fraction field 12 will contain 30 bits. This means that numbers between 0.25 and 2.0 can be represented with 30 bit accuracy. When $\hat{G} = 1$ there are 2 bits of exponent and 29 bits of fraction, and numbers between $2^{-4}$ and $2^3$ can be represented with 29 bits of accuracy. It should be noted that all numbers that can be represented with $\hat{G} = 0$ also have a representation with $\hat{G} = 1, 2, 3 \ldots$. In fact, each successively larger $\hat{G}$ value can represent all numbers that can be represented by each smaller $\hat{G}$ value. It is assumed that each particular number is represented with the smallest possible value of $\hat{G}$.

As $\hat{G}$ increases, a larger and larger range of numbers can be represented with less and less accuracy. When $\hat{G} = 3$ so that there are 4 bits of exponent and 27 bits of fraction, the accuracy of representation is the same as that of conventional floating point numbers on familiar machines while the range of numbers is from $2^{-16}$ to $2^{15}$. Finally, when $\hat{G} = 7$ there are 8 bits of exponent and 23 bits of fraction and the range of numbers that can be represented is $2^{-256}$ to $2^{255}$.

The following comparison can be made between this tapered floating point representation and a conventional floating point representation having seven bits of exponent and 27 bits of fraction. The tapered floating point representation has about one extra decimal digit of accuracy for numbers near 1.0 (in magnitude). For numbers that are between $10^{-4}$ and $10^4$ the tapered floating point representation results in at least the same accuracy as the conventional representation. Numbers between $10^{-77}$ and $10^{77}$ are represented by the tapered floating point word without overflow and with the loss of slightly more than one decimal digit of accuracy.

As is now obvious to those of ordinary skill in the art, other choices in the length of the *G* field and other interpretations of the *G* field can, for very large or very small numbers, give very startling trade-offs between extended range and loss of accuracy. For example, suppose that the *G* field has 3 bits as before but that the *G* field is interpreted to mean that the number of exponent bits is $$e = \hat{G} + 4 \tag{6}$$

then the number $f$ of fraction bits will be $$f = 27 - \hat{G} . \tag{7}$$

With this interpretation numbers which are near 1.0 in magnitude are represented with no loss of accuracy, but the range of numbers is extended approximately from $10^{-600}$ to $10^{600}$. Further, the loss of accuracy at the extreme ends of this range is only slightly more than two decimal digits.

Figure 3:
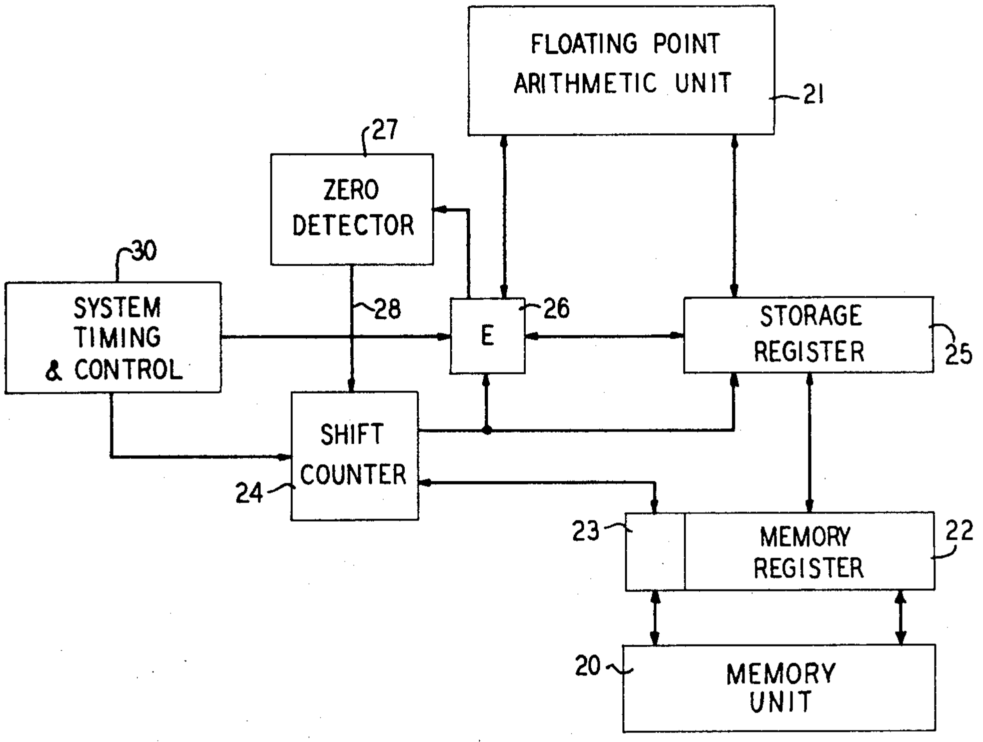
FIG. 3 illustrates the manner in which the tapered floating point representation can be utilized in existing floating point arithmetic circuitry.

The tapered floating point representation shown in FIG. 2 can be used in a digital computing system in the manner shown in FIG. 3. FIG. 3 can best be understood by first considering the transfer of a tapered floating point word from memory unit 20 to floating point arithmetic unit 21, and then considering the transfer of a conventional floating point word from arithmetic unit 21 to memory unit 20.

All of the arithmetic operands stored in memory unit 20 are assumed to be stored in tapered floating point form. As each operand is accessed from memory unit 20, it is transferred to memory register 22. Shift counter 24 is then reset and the leftmost portion 23 of memory register 22, which contains the *G* field, is transferred from memory register 22 to shift counter 24. The remainder of the contents of memory register 22, representing the exponent and fraction of the operand, are transferred to storage register 25.

At this point the conversion from tapered floating point representation to conventional floating point representation takes place. The object of this conversion is to transfer the exponent to exponent register 26 and leave the fraction in storage register 25. This is accomplished by the shift counter 24 which merely left-shifts the contents of the storage register 25 into the E register 26. The length of the shift is determined by the value of the *G* field previously read into the shift counter 24. If the *G* field is to be interpreted as previously discussed, such that the number of exponent bits *e* is equal to *G* plus a constant, then it is necessary that the value of the constant be the value to which shift counter 24 resets at the beginning of the conversion process. For example, if the value of *e* is determined by Equation (4), then shift counter 24 must reset to 1. If the value of *e* is determined by Equation (6) then shift counter 24 must reset to 4.

After the left-shift has been completed, the contents of the *E* register 26 and the storage register 25 can then be transferred to floating point arithmetic unit 21. Since the operand is then in conventional floating point form, floating point arithmetic unit 21 can be of conventional design. Of course, to obtain the greatest possible benefit from the tapered floating point representation, the arithmetic unit should be capable of handling the largest number of both fraction and exponent bits that could possibly occur in the particular fixed-length tapered floating point word being used.

When a number is to be transferred from floating arithmetic unit 21 to memory unit 20, the exponent is transferred into exponent register 26 and the fraction is transferred into storage register 25. At this point the conversion from conventional floating point representation back to tapered floating point representation takes place.

Shift counter 24 causes the combined information in *E* register 26 and storage register 25 to be right-shifted until zero detector 27 determines that the contents of the *E* register 26 are zero. Shift counter 24 is incremented for each right shift that is performed. Of course, shift counter 24 must be preset before each conversion in accordance with the manner in which the *G* field 23 is interpreted. For example, if the value of *e* is determined by Equation (4) then shift counter 24 must be preset so as to be equal to zero after the first right shift. If the value of *e* is determined by Equation (6) then shift counter 24 must be preset so as to be equal to zero after four right shifts have occurred.

When zero detector 27 detects that the contents of *E* register 26 is zero, it signals shift counter 24 on line 28. Shift counter 24 then terminates the shifting operation. The contents of storage register 25 are then transferred to memory register 22, and the contents of shift counter 24 are then transferred to *G* field 23. At this point the contents of memory register 22 comprise the tapered floating point representation of the operand, and hence the contents of memory register 22 can be transferred to memory unit 20.

The timing and control signals required to perform the above operation are provided by system timing and control 30, which represents the control unit of the particular digital device being used. The details of system timing and control 30, as well as the details of the floating point arithmetic unit shown in FIG. 3, are in fact well known to the prior art as shown, for example, by U.S. Pat. No. 3,037,701 entitled "Floating Decimal Point Arithmetic Control Means for Calculator" granted to H. M. Sierra on June 5, 1962. These details will not be further discussed here since the instant invention resides solely in the manner in which this well-known apparatus is used in accordance with the foregoing description to take advantage of the novel tapered floating point representation.

What is claimed is:

1. Apparatus for converting a three-field floating point computer word to a conventional fixed-field computer word comprising:

- means for transferring the data signals of a three-field floating point computer word to a memory register;
- means for shifting the fixed-field signals of said word from the memory register adding a predetermined signal and placing the resulting data signal sum in a shift counter;
- means for transferring the remainder of the data signals of the memory register to a storage register;
- means for shifting the signals of the storage register into an exponent register where the number of signals shifted is controlled by said data signal sum in said shift counter; and
- means for transferring to an arithmetic unit the data signals of the exponent register and said storage register respectively as the exponent field and fraction field of a conventional computer word.

2. Apparatus for converting a conventional fixed-field computer word to a three-field floating point computer word comprising:

- means for transferring the data signals of the exponent field and the data signals of the fraction field of a conventional computer word respectively to an exponent storage register and a storage register;
- a shift counter in which is stored the data signal sum of a predetermined signal and the fixed-field signals of a three-field computer word;
- means for shifting the signals in the exponent register into the storage register where the number of signals shifted is controlled by the signal sum placed in said shift counter;
- means for transferring the signals in said storage register to a memory register; and
- means for shifting said fixed-field signals into said memory register to form a three-field floating point computer word.

3. A circuit for converting a three-field floating point computer word to a conventional fixed-field computer word comprising:

- a data register for storing a computer word comprised of a first fixed length subgroup of bits and second and third variable length subgroups of bits;
- a first and a second shift register interconnected to permit the shifting of bits from said first shift register to said second shift register;
- means for transferring said second and said third subgroups of said bits to said first shift register; and
- a shift control circuit responsive to said first subgroup of bits for shifting said second subgroup of bits from said first shift register to said second shift register by performing a number of shifts equal in number to the magnitude of the number represented by said first subgroup of bits.

* * * * *